(12) United States Patent
Chickanosky et al.

(10) Patent No.: US 10,606,829 B1
(45) Date of Patent: Mar. 31, 2020

(54) METHODS AND SYSTEMS FOR IDENTIFYING DATA INCONSISTENCIES BETWEEN ELECTRONIC RECORD SYSTEMS USING DATA PARTITIONING

(71) Applicant: INTUIT INC., Mountain View, CA (US)

(72) Inventors: Joe Chickanosky, Mountain View, CA (US); Thomas Robert Ketter, Mountain View, CA (US); Carl Fantin, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 211 days.

(21) Appl. No.: 15/955,312

(22) Filed: Apr. 17, 2018

(51) Int. Cl.
*G06F 7/00* (2006.01)
*G06F 16/23* (2019.01)
*G06F 16/27* (2019.01)

(52) U.S. Cl.
CPC ........ *G06F 16/2365* (2019.01); *G06F 16/278* (2019.01)

(58) Field of Classification Search
CPC .............. G06F 16/2365; G06F 16/278; G06F 16/24554; G06F 16/45; G06F 16/55; G06F 16/65; G06F 16/75; G06F 16/27
See application file for complete search history.

(56) References Cited

U.S. PATENT DOCUMENTS

| | | | |
|---|---|---|---|
| 8,930,312 B1 * | 1/2015 | Rath | G06F 16/278 707/634 |
| 10,031,935 B1 * | 7/2018 | Cole | G06F 16/278 |
| 2014/0344236 A1 * | 11/2014 | Xiao | G06F 16/2358 707/696 |
| 2018/0137134 A1 * | 5/2018 | Deng | G06F 16/128 |
| 2019/0250991 A1 * | 8/2019 | Lee | G06F 11/1435 |

* cited by examiner

*Primary Examiner* — Azam M Cheema

(74) *Attorney, Agent, or Firm* — Patterson + Sheridan, LLP

(57) ABSTRACT

Certain aspects of the present disclosure provide methods and systems for efficiently identifying data inconsistencies between electronic record systems using data partitioning. In certain embodiments, data stored in each of two record systems may be partitioned into a number of groups. Corresponding groups of data from the two record systems may be compared for data inconsistency. Upon determining data inconsistencies between certain corresponding groups, additional partitioning and data comparison may be performed to identify the source of the data inconstancies.

20 Claims, 7 Drawing Sheets

FIG. 1

RECORD SYSTEM 105

DATA 110

TABLE 112

| GUID | Company Name | Company ID | Paycheck Amount | Bank Acc. # | Bank Acc. Type |
|---|---|---|---|---|---|
| 22a7 | 35646546569e6b73 | 3248730 | $3,300 | 1203947 | 2 |
| 88d3 | 6561676c6520a7668d | 2432098 | $5,333 | 3409355 | 2 |
| 3c38 | 626c6f636b6275737465 | 23430 | $23 | 2874900 | 2 |
| 298b | 7061746656e746c792063 | 3821 | $35 | 4300999 | 2 |
| 9f38 | 5374617264726966e6b73 | 2234324281 | $2,333 | 1233667 | 2 |
| 12b6 | 4635476c6520626172 | 65436341 | $87,465 | 5665332 | 1 |
| 7b32 | 656423453a4b545e4b | 24452 | $9,869 | 8676544 | 1 |
| 4c92 | 3211676c6520626172 | 223 | $7,631 | 7564576 | 1 |
| ... | | | | | ... |

RECORD SYSTEM 115

DATA 120

TABLE 122

| GUID | Company Name | Company ID | Paycheck Amount | Bank Acc. # | Bank Acc. Type |
|---|---|---|---|---|---|
| 22a7 | 35646546569e6b73 | 3248730 | $3,300 | 1203947 | 2 |
| 88d3 | 6561676c6520a7668d | 2432098 | $5,333 | 3409344 | 1 |
| 3c38 | 626c6f636b6275737465 | 23430 | $23 | 2874900 | 2 |
| 298b | 7061746656e746c792063 | 3821 | $35 | 4300999 | 2 |
| 9f38 | 5374617264726966e6b73 | 2234324281 | $12 | 1233667 | 2 |
| 12b6 | 4635476c6520626172 | 65436341 | $87,465 | 5665332 | 1 |
| 7b32 | 656423453a4b545e4b | 24452 | $9,869 | 8676544 | 1 |
| 4c92 | 3211676c6520626172 | 223 | $7,631 | 7564576 | 1 |
| ... | | | | | |

METHODS AND SYSTEMS FOR IDENTIFYING DATA INCONSISTENCIES BETWEEN ELECTRONIC RECORD SYSTEMS USING DATA PARTITIONING

Aspects of the present disclosure relate to methods and systems for efficiently identifying data inconsistencies between electronic record systems using data partitioning.

Organizations are creating and using an ever increasing amount of data. It is often the case that a single organization may create and use the same or similar data across different parts of the organization, such as across different business units. While it may be simplest to maintain a single, "master" set of data for use by the whole organization, such a configuration is impractical and inefficient for a variety of technical reasons. Thus, organizations frequently duplicate data, or store the same or similar data in different repositories, servers, record systems, and the like. For example, a large organization may implement a number of databases storing the same or similar data, where each of the databases may be used by a separate business unit that utilizes the data in different ways. In another example, an organization may replicate data that is stored in its source database system at a number of other duplicate database systems to assure fault tolerance and data availability in the event of data loss at the source database system. Unfortunately, it is not uncommon for data stored in different repositories to become out of sync or inconsistent because, for example, different parts of an organization may create, maintain, and store data in different ways as meets their particular use cases. In some cases, mere programming errors, such as replication programming, may introduce errors in data that is copied across different systems' repositories. As the number of database systems grows, so does the risk of data inconsistency among the systems.

Organizations have traditionally implemented a number of different solutions to resolve data inconsistencies among disparate data systems. For example, bit-by-bit, block-by-block, or similar replication and synchronization schemes may be used to keep data repositories consistent. However, existing solutions are inefficient in terms of resource utilization and may be extremely time consuming. In fact, in some cases, traditional synchronization schemes simply cannot keep up with the pace at which organizations create and change data.

Accordingly, what is needed are improved systems and methods for identifying data inconsistencies between data storage systems.

BRIEF SUMMARY

Certain embodiments provide a method of identifying data inconsistencies between electronic record systems using data partitioning. The method generally includes requesting a first data subset from a first record system using a first partition parameter and requesting a second data subset from a second record system using the first partition parameter. The method also includes receiving the first data subset comprising a first number of groups based on a first partition parameter and receiving the second data subset comprising a second number of groups based on the first partition parameter, wherein one or more groups in the second number of groups correspond to one or more groups in the first number of groups. The method further includes determining at least one group of the first number of groups where data associated with the at least one group of the first number of groups does not match data associated with a corresponding group in the second number of groups.

The method also includes, if number of records associated with the at least one group of the first number of groups exceeds a threshold, incrementing the first partition parameter by a partition increment to obtain a second partition parameter, requesting a third data subset from the first record system using the second partition parameter, and requesting a fourth data subset from a second record system using the second partition parameter. The method further includes receiving the third data subset comprising a third number of groups based on the second partition parameter, receiving the fourth data subset comprising a fourth number of groups based on the second partition parameter, and determining at least one group of the third number of groups where data associated with the at least one group of the third number of groups does not match data associated with a corresponding group in the fourth number of groups.

The method also includes, if a number of records associated with the at least one group of the third number of groups does not exceed the threshold, requesting a first data report from the first record system for the at least one group of the third number of groups, requesting a second data report from the second record system for the corresponding group in the fourth number of groups, and determining a record in the first data report that does not match a record in the second data report.

Also described herein are embodiments of a computer system, wherein software for the computer system is programmed to execute the method described above for identifying data inconsistencies between electronic record systems using data partitioning.

Also described herein are embodiments of a non-transitory computer readable medium comprising instructions to be executed in a computer system, wherein the instructions when executed in the computer system perform the method described above for identifying data inconsistencies between electronic record systems using data partitioning.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 1 illustrates example data stored in two different record systems, in accordance with certain embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 2A:
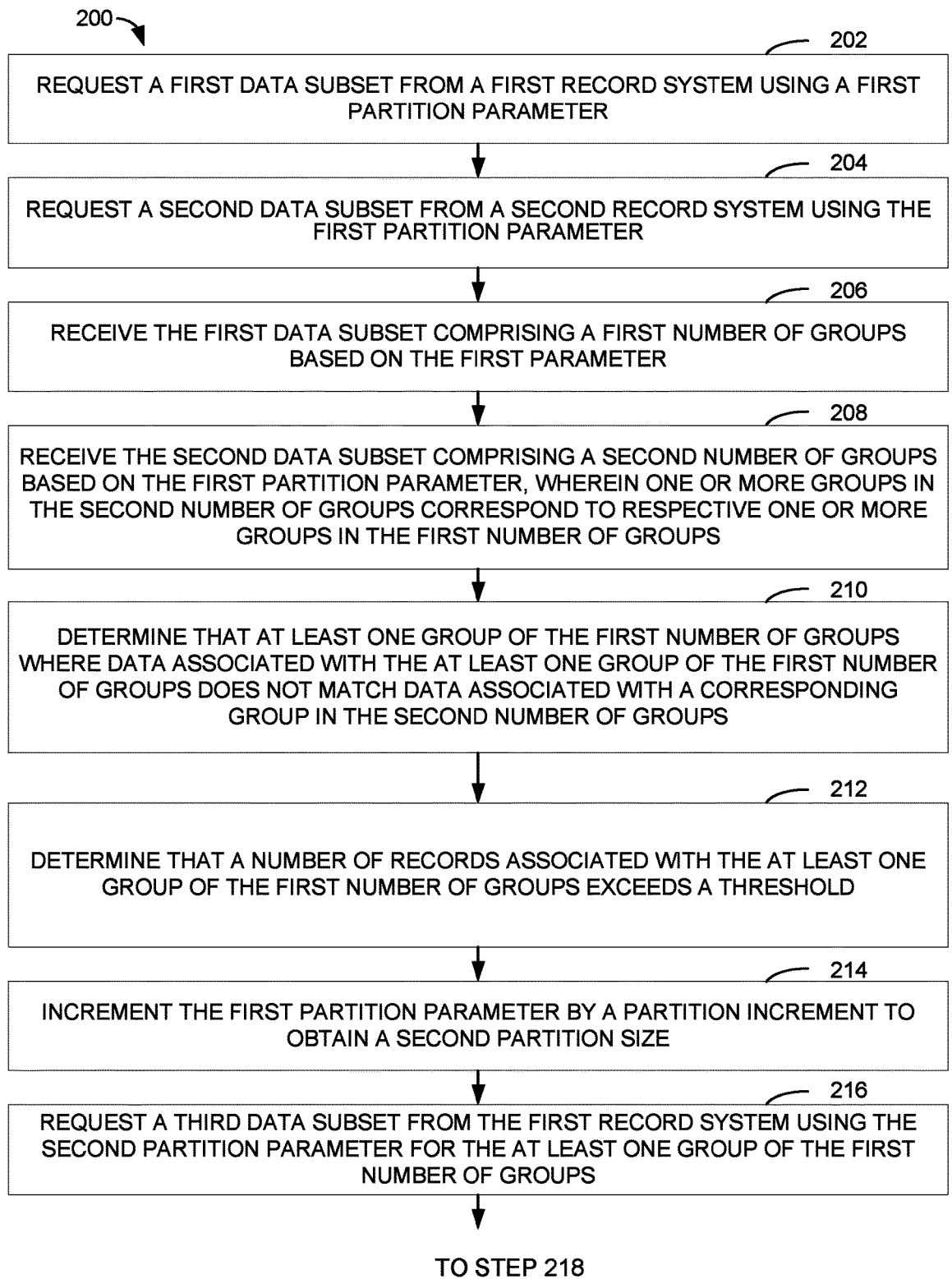
FIGS. 2A-2B illustrates an example method for efficiently identifying data inconsistencies between electronic record systems using data partitioning, in accordance with certain embodiments.

Aspects of the present disclosure provide apparatus, methods, processing systems, and computer readable mediums for identifying data inconsistencies between electronic record systems using data partitioning. In order to solve the problems with existing solutions, the data parity methods disclosed herein provide for iteratively partitioning data in large data repositories to reduce the amount of data that needs to be compared in order to find the inconsistency. In certain embodiments, an operation may be performed on the partitioned data in order to determine a partition-level indication of consistency or inconsistency of the underlying data without comparing the data element by element. For example, the sum of a particular field in each partition, or a number of records in each partition, may be compared to generate a partition-level parity check.

If a partition-level parity check passes, it may be assumed that the underlying data is consistent between the data repositories without the need to, for example, transport all of the data across a network, or the need to compare each individual data element in a first data repository to a corresponding element in a second repository. If a partition-level parity check fails, then the data may be further partitioned until such time as the amount of data left to compare (e.g., records from a record system) falls below a threshold. At such time, a comparison of full records in each data repository may be undertaken to specifically identify the inconsistency. Thus, utilizing these methods, significant time, computing resources, and networking resources may be saved thereby significantly improving the performance of a data parity system as compared to traditional systems and methods.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

FIG. 1 illustrates examples of record systems 105 and 115, which store records for an organization. For example, records systems 105 and 115 may be databases or the like for saving organizational data. In the specific example depicted in FIG. 1, record systems 105 and 115 are configured to store paycheck records relating to a number of companies. For example, one record system (e.g., 105) may be maintained and used by a human resource service provider, while another record system (e.g., 115) may be used by an accounting service provider. While these record systems should be consistent with each other (i.e., in sync or in parity), as depicted in FIG. 1, data 110 stored in record system 105 is not consistent with data 120 stored in record system 115.

As shown, data 110 comprises paycheck records which may, for example, be used by record system 105, or other systems having access to record system 105, for direct deposit purposes. In such an example, each paycheck record may correspond to an employee's biweekly income (e.g., paycheck amount). In FIG. 1, data 110 in record system 105 is stored in a table 112, such that each individual paycheck record corresponds to a row in table 112. In this example, each paycheck record includes a plurality of fields, including a globally unique identifier (GUID), a company name, a company ID, a paycheck amount, a bank account number, and a back account type. Note that in some other embodiments, each paycheck record may contain a different number of fields. For example, in some embodiments, each paycheck record may only contain two fields (e.g., company ID and paycheck amount).

As above, each paycheck record is assigned a GUID that is different than the GUIDs assigned to other paycheck records in the same record system 105. The company name and company ID fields indicate the name and identification number of a corresponding employee's company that has issued the paycheck record. The paycheck amount, as described above, may correspond to the employee's biweekly income. In addition, the bank account number on each paycheck record is associated with a corresponding employee's bank account. Finally, the bank account type corresponds to the type of bank account that the employee has registered. In this example, the type of bank account is represented by a numeric value where a checking account is indicated by number '1' and a savings account is indicated by number '2'.

As shown, the value of these fields may be stored in a variety of forms. For example, the fields may contain decimal values, hexadecimal values, binary values, text, etc. In the example of FIG. 1, the GUIDs and company names of each paycheck record are stored as hexadecimal values while the rest of the fields may include decimal values as well as characters and/or text. However, in other examples, the value of each field may be stored differently. For example, the company name field may store text (e.g., "Stardrinks") instead of a corresponding hexadecimal value (e.g., 537461726472696e6b73).

As described above, record systems 105 and 115 are meant to store consistent data, meaning that data 110 and data 120 are meant to be identical. However, data 110 and 120 may become inconsistent (i.e., out of sync or not in parity) for various reasons. In some cases, the inconsistencies may be in the form of two corresponding records with different field data, while in other cases, a record may exist in one record system (e.g., record system 105), but not another (e.g., record system 115). By way of example, the paycheck record with GUID 88d3 in record system 105 includes bank account number 3409344 and bank account type 1 (i.e., checking account) while the paycheck record with the same GUID 88d3 in record system 115 includes bank account number 3409355 and bank account type 2 (i.e., savings account). As another example, the paycheck record with GUID 9f38 in record system 115 includes a paycheck amount of $12, which differs from the paycheck amount of $2,333 associated with the same GUID 9f38 in record system 105.

This data inconsistency among record systems 105 and 115, as described above, may cause significant issues for an organization relying on both record systems. For example, suppose record system 105 is used for conducting direct deposits while record system 115 is used for generating business expense reports for tax purposes. In such an example, the amount paid to an individual and the amount reported to the Internal Revenue Service (IRS) may not be consistent, which may lead to tax issues. Many other problematic situations are imaginable.

As above, existing solutions used to identify data inconsistency among systems are inefficient and time consuming. For example, they may use considerable processing and networking resources to gather the data (e.g., from remote data storage systems) and to compare the data. An example of an existing, inefficient solution for identifying data inconsistencies is performing a pairwise comparison between a first dataset from a first system and a second dataset from a second system. For example, utilizing such a method may entail comparing each paycheck record of record system 105 with a corresponding paycheck record (e.g., matched by GUID) of record system 115 to determine if the data in each record is consistent (i.e., if it matches). In this example, the more unique fields each record has, the more individual comparisons have to be made for each record, which compounds the time and efficiency problem.

Embodiments described herein relate to improved methods and systems for identifying inconsistencies between data storage systems, such as electronic record systems (e.g., record systems 105 and 115) using data partitioning. Partitioning refers to dividing sets of data into a number of groups based on attributes of the data. Moreover, the partitioning may be iterative in that initially the data is partitioned in such a way as to create relatively larger data sets and as the methods proceed, the data is partitioned into relatively smaller data sets. As described further with respect to FIGS. 2A-6, below, using partitioning allows for identifying and resolving data inconsistencies in a more efficient and expeditious manner. For example, partitioning may lead to significant performance improvements when confirming data parity, such as by reducing network load (because less data needs to be retrieved), reducing processing load (because less data needs to be compared), and reducing the time necessary to check parity (for both of the aforementioned reasons).

Partitioning, in some embodiments, may be performed using a certain data field, associated with records in a record system, which is referred to herein as the partition field. A partition field indicates which data field in records stored in a record system is used to partition the records. Partitioning, in some embodiments, may be performed, also using a partition parameter. A partition parameter may, for example, indicate the number of elements (e.g., number of digits, letters, characters, etc.) of a partition field to be considered when partitioning the records, and may also affect the number of groups returned from a record system.

For example, suppose when confirming data parity between record systems 105 and 115 in FIG. 1 (regarding data 110 and data 120, respectively), the partition field is the company ID associated with the paycheck records. In such an example, a partition parameter of '1' means that the paycheck records in data 110 of record system 105 are partitioned based on a single element (e.g., digit, letter, character, etc.) of the company ID, such as the last element. This results in the paycheck records being partitioned into ten record groups, where each group comprises paycheck records with company IDs ending in one of ten distinct digits: '0' to '9'. For example, all paycheck records with company IDs ending in 0 may be partitioned, from all the other paycheck records with company IDs ending in different numbers, and put in a single group ("Group 0").

Figure 4:
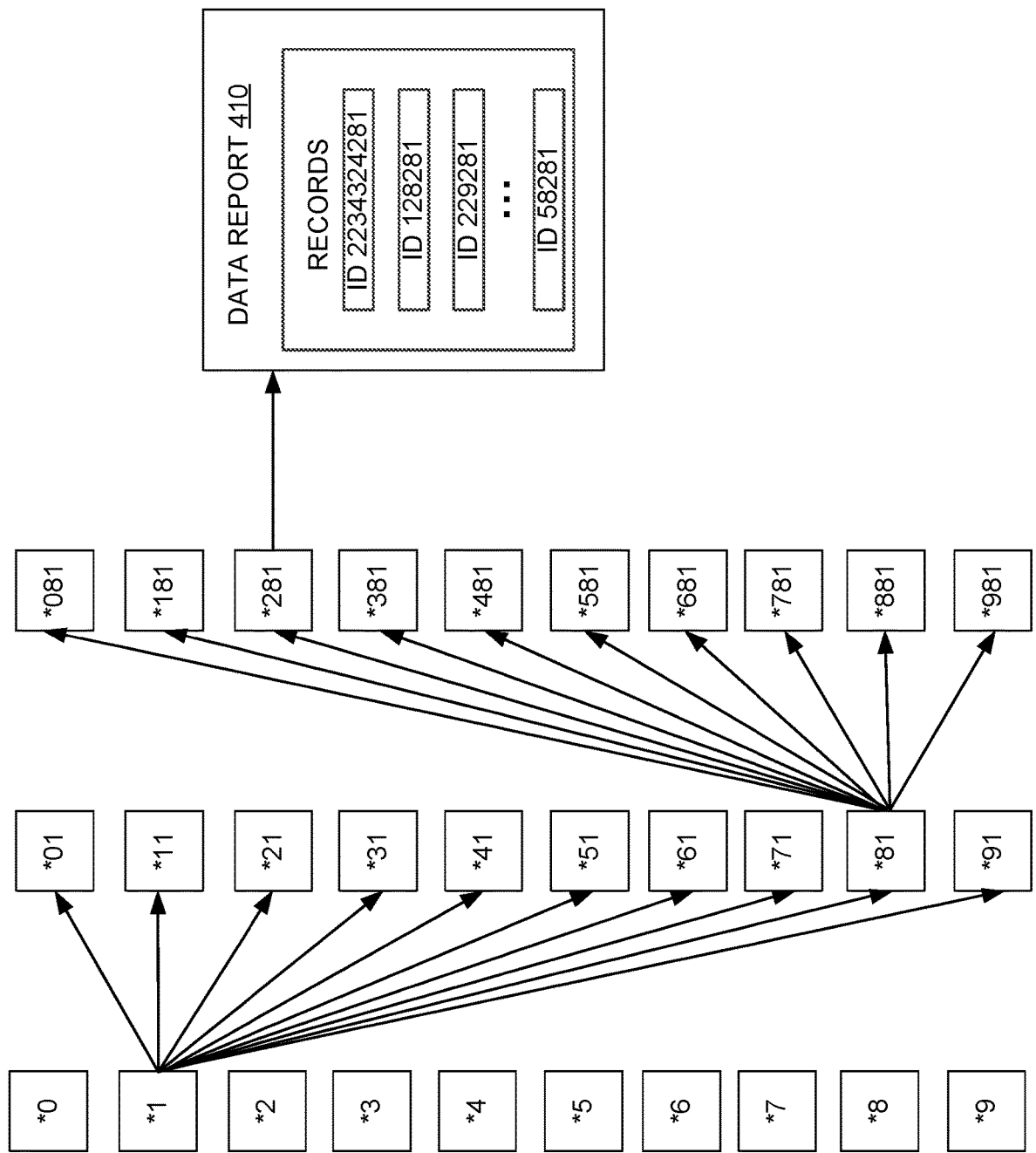
FIG. 4 illustrates an example partitioning of records in a record system based on the records' company IDs, in accordance with certain embodiments.

In the example of FIG. 1, Group 0, includes at least paycheck records with company IDs 3248730 and 23430, as shown in table 112. Group 1 includes all paycheck records with company IDs ending in 1. In the example of FIG. 1, Group 1, therefore, includes at least paycheck records with company IDs 3821, 2234324281, and 65436341 and so on. As example of this grouping is illustrated in FIG. 4, as described below. Note that in some examples, the partition parameter may refer to the number of digits starting from the beginning of a particular field's value, instead of the end. So, for example, a partition parameter of '1' may divide records into groups starting with digits '0' through '9'.

As described above, grouping the paycheck records based on their company IDs' last ending digits results in partitioning the paycheck records into ten groups, assuming each group at least includes one paycheck record. For example, in some embodiments, if there is no paycheck record with a company ID ending in '6', then only nine groups may result from the partitioning (e.g., Groups 0-5 and 7-9). In some other embodiments, even if a paycheck record having a company ID with a certain ending number does not exist, a corresponding group may still be generated, although the group would not include any records.

Using a smaller or larger partition parameter than '1' results in a fewer or larger number of potential groups, respectively. For example, a partition parameter of '0' results in no partitioning of the paycheck records by record system 105. In other words, all paycheck records with different company IDs remain in one group. On the other hand, a partition parameter of '2' results in a hundred potential groups (e.g., Groups 00-99). In such an example, Group 00 comprises all paycheck records with company IDs ending in '00', Group 01 comprises all paycheck records with company IDs ending in '01', and so on. Generally, as the number of groups goes up, the number of paycheck records within each group goes down.

The partition parameter, in some embodiments, may be selected based on the nature and the likelihood of data inconsistencies between two record systems. For example, in some cases, when there is a high likelihood of data inconsistency between two record systems, it might not be useful to select a very low partition parameter, such as 0. This is because receiving all paycheck records in one huge group without any partitioning being performed by the record systems may only indicate whether there is a data inconsistency between the two record systems. However, no indication as to the source of data inconsistency may be provided, in such an example. A larger partition parameter, in contrast, provides a more detailed and in-depth analysis and allows for ruling out groups with no data inconsistency in a more expeditious manner. On the other hand, selecting a very large partition parameter, when such a detailed analysis is unnecessary, may also be a waste of processing power etc.

In some embodiments, the partitioning may be performed by each record system using a modulus operation. In computing, a modulus refers to an operation that finds the remainder after the division of one number by another. For example, a partition parameter of '1' may correspond to a modulus of 10 while a partition parameter of '2' may correspond to a modulus of 100. Accordingly, to partition paycheck records based on their company IDs' last ending digit, a modulus of 10 may be used. In such an example, a division of all company IDs by 10 results in remainders of '0' through '9', assuming there is at least one company ID ending with each digit between '0' and '9'. As a further example, partitioning the paycheck records by applying a modulus of 100 results in a hundred groups of 00-99.

Note that the embodiments described herein may be implemented regardless of the nature of the data that is being examined for consistency or what the data includes. As such, the datasets shown in FIG. 1 (i.e., data 110 and 120) are merely used for illustration purposes and to provide a better understanding of the following figures and embodiments described herein.

Figure 2B:
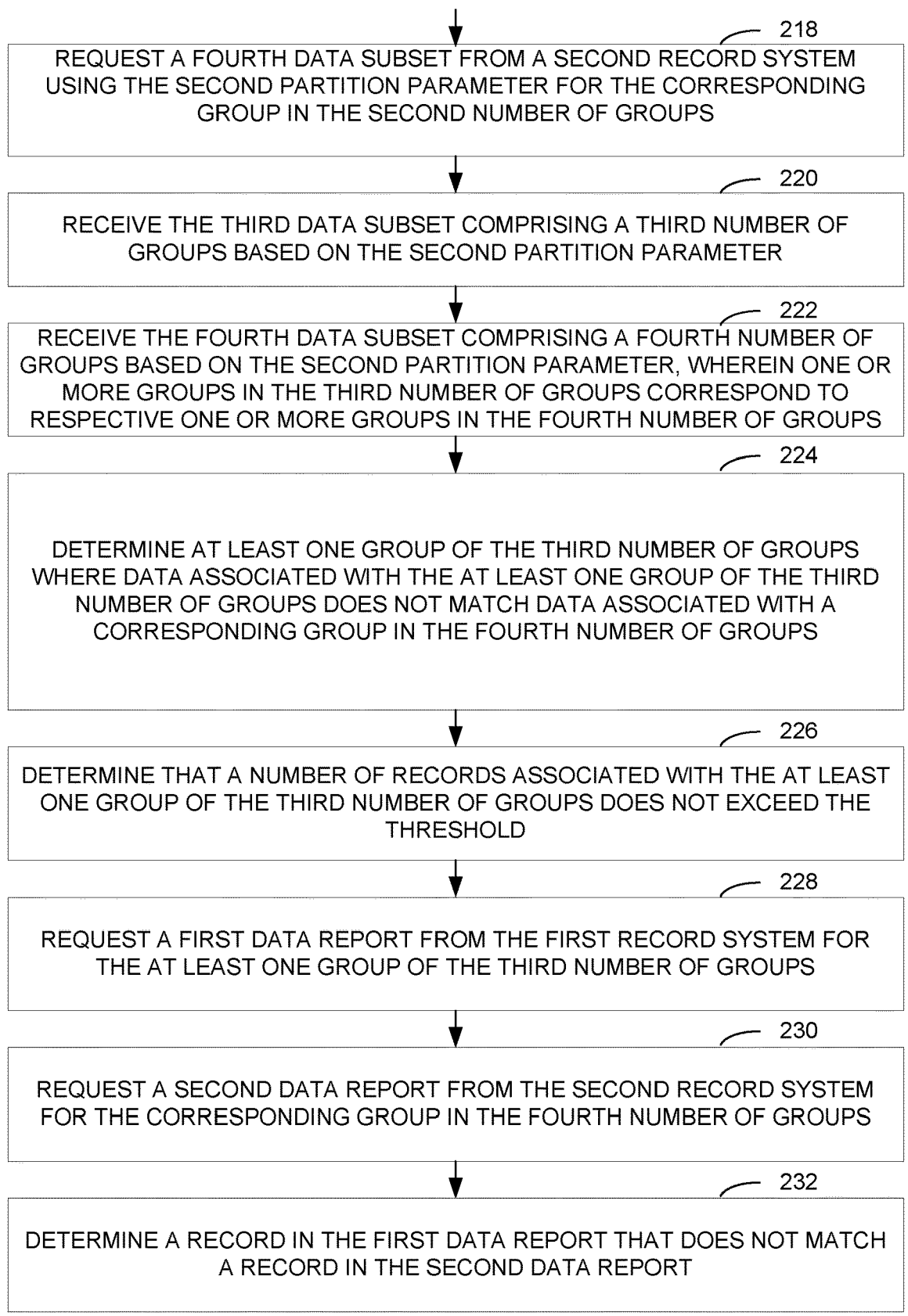

FIGS. 2A-2B illustrate an example method 200 for efficiently identifying data inconsistencies between a first system (e.g., record system 105 in FIG. 1) and a second record system (e.g., record system 115 in FIG. 1) using data partitioning. In some embodiments, the steps of method 200 may be performed by a system (herein after referred to a data parity system) that is separate from the first record system and the second record system. In such embodiments, the data parity system is configured to, for example, identify data inconsistencies (i.e., disparities) between the first and the second record systems and, in some embodiments, to cause the two record systems to become synchronized. In other embodiments, one of the first or the second record systems may, instead, identify data inconsistencies between the two systems.

The method begins at step 202, where a first data subset from a first record system (e.g., record system 105 in FIG. 1) is requested based on a partition field and a first partition parameter. In this example, the partition field indicates which field in a particular record stored in a record system is used to partition the data. Also in this example, the partition parameter is used to control the number of records returned in each group from the record systems. As above, the partition parameter may, for example, indicate the number of elements (e.g., number of digits, letters, characters, etc.) of a particular field to be considered when partitioning the records, and may also affect the number of groups returned from a record system.

For example, a data parity system may transmit a request to record system 105 of FIG. 1, where the request includes a partition field and a partition parameter. In one example, suppose the partition field is the company ID associated with the paycheck records and the partition parameter is '1'. Although, in other examples, the partition field may be a GUID, company name, or bank account number associated with the paycheck record, or other fields that are implemented in the record system. Also, in other examples, another partition parameter (e.g., larger or smaller) may be used.

In the example above, in response to the request received from the data parity system and based on the partition field and partition parameter, record system 105 partitions all paycheck records in data 110 into 10 groups wherein each group comprises paycheck records with company IDs ending in one of digits '0' to '9'. For example, Group 0 from record system 105 includes paycheck records with company IDs 3248730 and 23430, as shown in FIG. 1.

At step 204, a second data subset from a second record system is requested using the first partition parameter. For example, similar to the request sent to record system 105 described above, here the data parity system may send a request to record system 115 using the same partition field and the same partition parameter. In response to the request and based on the partition field and partition parameter, record system 115 partitions all paycheck records in data 120 into 10 groups wherein each group comprises paycheck records with company IDs ending in one of digits '0' to '9'. For example, Group 0 from record system 115 includes paycheck records with company IDs 3248730 and 23430, as shown in FIG. 1.

At step 206, the first data subset comprising a first number of groups based on the first partition parameter is received. For example, assuming the first partition parameter is '1', the data parity system receives up to 10 groups, each comprising a number of records with company IDs ending in one of digits '0' to '9.'

In some embodiments, the records received from the first system may not be identical copies of the records that are stored in the first system. In other words, the records that are received from a record system may only include a subset of the data in the records that are stored in the record system. In the example of FIG. 1, as described above, each paycheck record stored in, for example, record system 105, includes a number of data fields, such as the company name, paycheck amount, bank account number, bank account type, etc. However, after partitioning the records based on the partition field and partition parameter received in a request (e.g., step 202) from the data parity system, record system 105 may only send back one or two data field values associated with each record and not all the data field values or details regarding the record. For example, record system 105 (or record system 115 in step 208) may only send back each record's partition field value (e.g., company ID) as well as another data field value (e.g., paycheck amount), which, as described below in relation to step 210, may be used by the data parity system for performing data parity check between the two systems. In some cases, where the data subset including the partitioned groups are transmitted over the network, selecting only a few data field values from each record and transmitting the selected data field values helps with reducing the amount of data that is transmitted over the network. Accordingly, in some embodiments, a data subset that is received from a record system may refer to or include a subset of the data in the records that are stored in the record system.

At step 208, the second data subset comprising a second number of groups based on the first partition parameter is received. As above, assuming the first partition parameter is '1', the data parity system receives up to 10 groups in the second data subset. Further, one or more groups in the second number of groups correspond to respective one or more groups in the first number of groups.

Continuing with the example above, the data parity system may receive 10 groups of paycheck records from record system 105 and 10 groups of paycheck records from record system 115, which correspond to the 10 groups received from record system 105. For example, Group 0 received from record system 105 corresponds to Group 0 received from record system 115, Group 1 received from record system 105 corresponds to Group 1 received from record system 115, and so on. The corresponding groups may each be referred to as a group pair. As described above, in some embodiments, if a record having company ID with a certain ending number does not exist in one of the record systems, the data subset received from that record system may not contain a group corresponding to that ending number. For example, if record system 115 was missing paycheck records with company IDs ending in 6, the data subset received from record system 115 may only include groups 0-5 and 7-9 (although in other embodiments, record system 115 may still generate a Group 6 even though no records may exist in the group). In such an example, groups 0-5 and 7-9 received from record system 105 correspond to groups 0-5 and 7-9 received from record system 115, however, Group 6 received from record system 105 does not have a corresponding group from record system 115 as no such group exists in the data subset received from record system 115. In the example method 200 described with respect to FIGS. 2A and 2B, it is assumed that even if a record having a company ID with a certain ending number does not exist in one of the record systems, the record system still generates a corresponding group for that ending number, even if the group is empty.

At step 210, at least one group of the first number of groups is determined where data associated with the at least one group of the first number of groups does not match data associated with a corresponding group in the second number of groups (i.e. the data in the corresponding groups is inconsistent or disparate).

For example, referring back to FIG. 1, after receiving the 10 groups from record system 105 and the 10 groups with record system 115, the data parity system may perform a comparison between each corresponding group pair to confirm data parity between the pair. For example, the data parity system may start with comparing Group 0 associated with record system 105 with Group 0 associated with record system 115.

Several methods may be used to compare data between each corresponding group pair. As a first example, a number of records in each group may be counted and compared. So, referring back to FIG. 1, the number of paycheck records in each corresponding group pair may be calculated and compared. For example, Group 0 associated with data 110 may contain 200 paycheck records while Group 0 associated with data 120 may contain 199 paycheck records. In such an example, a comparison of the number of paycheck records between the groups indicates a data inconsistency. Utilizing this method, however, may indicate an existence of data inconsistency only when one or more records are missing from one of the record systems. In other words, other types of data inconsistencies, such as incorrect paycheck amounts or bank account numbers, may not be identifiable by comparing paycheck record counts between the two groups.

As a second example, the data parity system may calculate a field sum for all the records in each group of a corresponding group pair. For example, referring back to FIG. 1, the data parity system may calculate a sum for the "Paycheck Amount" field by aggregating paycheck amounts for all records in Group 0 associated with record system 105 and compare this to another sum for the "Paycheck Amount" field by aggregating paycheck amounts for all records in Group 0 associated with record system 115. Following this example, Group 0 of from record system 105 includes at least paycheck records with company IDs 3248730 and 23430. A paycheck amount field sum for those paycheck records is calculated by aggregating paycheck amount $3,330 associated with the paycheck record having company ID 3248730 and paycheck amount $23 associated with the paycheck record having company ID 23430, which results in $3,353. Group 0 of record system 115 also includes at least paycheck records with company IDs 3248730 and 23430 and, therefore, a paycheck amount field sum calculated for those records results in $3,353. Thus, a comparison of the paycheck amount field sums between Group 0 of record system 105 and Group 0 of record system 115 shows no data inconsistency. Note that the calculations illustrated herein have been purposefully limited to only include the few paycheck records of Group 0 that are shown in FIG. 1 in order to simplify and provide a clear understanding of the embodiments. However, there may generally be many more (e.g., hundreds or thousands) paycheck records in each of groups 0-9 received from each of the record systems.

Continuing with the example based on FIG. 1, having compared data between Group 0 of record system 105 and Group 0 of record system 115, the data parity system proceeds to confirming data parity between the other group pairs. For example, to confirm data parity between Group 1 of record system 105 and Group 1 of record system 115, the data parity system calculates a sum of the "Paycheck Amount" field for Group 1 of record system 105 and Group 1 of record system 115. Specifically, with respect to FIG. 1, the "Paycheck Amount" field sum for Group 1 of record system 105 is calculated by aggregating paycheck amounts of paycheck records with company IDs 3281, 2234324281, and 65436341, which results in $35+$2,333+$87,465=$89,833. The paycheck amount field sum for Group 1 of record system 115 is calculated by aggregating paycheck amounts of paycheck records with company IDs 3281, 2234324281, and 65436341, which results in $35+$12+$87,465=$87,512. Accordingly, a comparison of the paycheck amount field sums between Group 1 of record system 105 and Group 1 of record system 115 reveals a data inconsistency. This data inconsistency indicates to the data parity system that one or more paycheck records have paycheck amounts that do not match across record systems 105 and 115.

Notably, the aforementioned example of summing the "Paycheck Amount" field is merely one example, and any other field could be used. For example, a sum of bank account numbers for all records of each group in a group pair may be calculated, which results in two sums that may then be compared for data inconsistency. As an example, for Group 0 of record system 105, the sum of all bank account numbers of the paycheck records in the group is 1203947+2874900=4,087,847. In another example, a sum of only a certain number of digits (e.g., the last four digits) of a field, such as the "Bank Account #" field may be calculated instead. Using this method, for example, Group 0 of record system 105 would have a sum of 3947+4900=8,847 based on the last four digits of all the bank account numbers in the group. Limiting any particular field to a certain number of digits, such as the bank account numbers to their last four digits, is just one example, and many others are possible.

In some embodiments, the sum of company names (e.g., provided in hexadecimal numbers or any other form) may be used for identifying data inconsistency among a group pair. In some embodiments, the sum of bank account types (e.g., provided in decimal or binary) may be used for identifying data inconsistency among a group pair. For example, for Group 0 of record system 105, the sum of all bank account types of the paycheck records in the group is 2+2=4. In some embodiments, the sum of GUIDs or company IDs may also be used for parity check. For example, non-matching GUID or company ID sums may indicate missing records. As described above, the data fields provided here are merely examples. Accordingly, the same methods may be used for any fields in the retrieved data records.

In another example, information (e.g., paycheck records) included in each group of a group pair may be hashed using a hashing function to derive two hash values. The hash values may then be compared to determine if there is any data inconsistency between the groups. In yet another example, a checksum value may be calculated based on information (e.g., paycheck records) included in each group of a group pair to derive two checksum values. For example, a checksum may be calculated based on one or more data fields of each of the paycheck records in each group. Other methods of comparing data are equally applicable to the methods described herein.

In some embodiments, a combination of two or more of the aforementioned methods may be used, which results in providing a more robust analysis of data inconsistency. For example, if only sums of paycheck amounts are used to identify data inconsistencies between groups of a certain group pair and the sums match, it may be concluded that there is no data inconstancy between the groups and that the corresponding paycheck record data is accurate. However, although the paycheck amounts in each group may match, the bank account number may not match. Therefore, a combination of these methods may be used to help identify as many data inconsistencies as possible.

Referring back to step 210 of FIG. 2A, after identifying at least one data inconsistency between Group 1 of record system 105 and Group 1 of record system 115 using the sums of each group's paycheck amounts, in some embodiments, the data parity system may continue to perform the same operations for the remaining group pairs in order to find other potential group pairs with inconsistent data. In such embodiments, for each group pair with inconsistent data, the data parity system may then continue the operations of method 200. In some other embodiments, upon identifying the first group pair with data inconsistency, the data parity system may continue the operations of method 200 for that group pair before performing a data parity check for the other group pairs received as a result of steps 206 and 208. For instance, in the example of FIG. 1, upon identifying a data inconsistency issue with Groups 1 of record system 105 and record system 115, the data parity system continues the operations of method 200 to determine the source of the data inconsistency and request reports from the record systems before returning to performing data parity checks for the other group pairs (e.g., Group 2 of record system 105 and Group 2 of record system 115, . . . , Group 9 of record system 105 and Group 9 of record system 115).

Unlike the example provided by FIG. 1 where there is data inconsistency among record system 105 and record system 115, in examples where all the group pairs are compared (e.g., using the one or more data comparison methods described above) and no data inconsistency is identified, the data parity system may determine that record system 105 and record system 115 are in synchronization.

At step 212, it is determined that a number of records associated with the at least one group of the first number of groups exceeds a threshold. The threshold may serve to reduce the total amount of data that needs comparison in order to reduce processing load and network utilization, among other things. When the threshold number of records in a group is exceeded, the method may proceed to changing the partition increment in order to reduce the number of records that need comparing. So, continuing with the example based on FIG. 1, having identified that there is an inconsistency between Group 1 of record system 105 and Group 1 of record system 115, the data parity system determines if the number of records in either or both of the groups exceeds a certain threshold number. In some embodiments, the threshold number may correspond to a number of records in either or both of the groups. In some embodiments, the threshold number may correspond to a certain amount of information (e.g., in kilobytes megabytes, etc.) relating to the number of records in either or both of the groups. In yet other embodiments, the threshold number may be determined based on any other characteristic of the records. The threshold number may be useful to increase the efficiency of the method by limiting the amount of data that is requested, which traverses a network, which is processed, etc.

If the number of records does not exceed the threshold number, then the data parity system may request data reports from record system 105 and record system 115 (an example of this is described in relation to steps 228 and 230 of method 200). The data parity system may then identify the source of data inconsistency by comparing the data reports and take steps to resolve the inconsistency, such as by forcing one or both of the record systems to update their data.

At step 214, assuming the number of records associated with the at least one group in the first number of groups exceeds the threshold, the first partition parameter is incremented by a partition increment to obtain a second partition parameter. In some embodiments, a partition increment may indicate a number of data elements that should be added to or multiplied by the first partition parameter. For example, assuming the first partition parameter is '1', as described above, incrementing the first partition parameter by a partition increment of '1' results in a second partition parameter of '2'. A partition parameter of '2' means that paycheck records will be partitioned based on the last two data elements (e.g., digits) of the selected partition field. Similarity incrementing the first partition parameter by a partition increment of '2' results in a second partition parameter of '3'. A partition parameter of 3 means that paycheck records will be partitioned based on the last three data elements of the selected partition field. In embodiments where the partition parameters are indicated as moduli, the partition parameter may be incremented by a factor of 10 (i.e., multiplied by a partition increment of 10) each time it is increased, i.e., going from 10 to 100 to 1,000, and so on. For example, a first modulus of 10 (corresponding to a partition parameter of 1) may be incremented by multiplying the first modulus by a partition increment of 10 to obtain a second modulus of 100. A modulus of 100, for example, requires that paycheck records be partitioned based on their partition fields' last two data elements.

At step 216, a third data subset from the first record system is requested using the second partition parameter for the at least one group of the first number of groups. Continuing with the example based on FIG. 1, after identifying a data inconsistency between Group 1 of record system 105 and Group 1 of record system 115 and determining that the number of paycheck records in one or both of Group 1 of record system 105 and Group 1 of record system 115 exceeds a threshold amount, the data parity system requests that the paycheck records in Group 1 of record system 105 and Group 1 of record system 115 be further partitioned in order to more efficiently identify one or more sources of data inconsistencies between the groups. As such, for example, after receiving the request from the data parity system, record system 105 partitions paycheck records in Group 1 of record system 105 using the second partition parameter. Assuming the second partition parameter is 2, record system 105 partitions the paycheck records in Group 1 of record system 105 into 10 groups (i.e., Groups 01, 11, 21, 31, . . . , 91, referred to as the "third number of groups" above). For example, Group 01 comprises paycheck records having company IDs ending in 01, Group 11 comprises paycheck records having company IDs ending in 11, . . . , and Group 91 comprises paycheck records having company IDs ending in 91. Using this method, the records are further partitioned, which makes it more efficient and expeditious to rule out groups that have consistent data and focus on groups that have inconsistent data. As an example, if Group 1 initially included 1,000 records, in some cases, partitioning the records using a partition parameter of 2 may result in each of Groups 01, 11, 21, 31, . . . , 91 having fewer than 100 records. In the example of record system 105 of FIG. 1, the paycheck record with company ID 3821 is included in Group 21, the paycheck record with company ID 2234324281 is included in Group 81, and the paycheck record with company ID 65436341 is included in Group 41.

In one example, the partition increment may be '2' instead of '1' resulting in a partition parameter of '3'. In such an example, paycheck records of Group 1 of record system 105 are the partitioned into a 100 groups of 001-991. Using a larger partition increment allows for a more granular data inconsistency analysis among the groups. A higher granularity is especially advantageous in cases where there is a significant number of paycheck records in each group and allows for the source of data inconsistency to be identified more expeditiously.

At step 218, a fourth data subset from the second record system is requested using the second partition parameter for the corresponding group (i.e., the group corresponding to the at least one of the first number of groups) in the second number of groups. For example, similar to the request sent to record system 105, a request is sent to record system 115 for partitioning the paycheck records in Group 1 of record system 115 using the second partition parameter of 2. As a result, record system 115 also partitions the paycheck records of Group 1 of record system 115 into 10 groups (i.e., Groups 01, 11, 21, 31, . . . , 91, referred to as the fourth number of groups above). In the example of record system 115 of FIG. 1, the paycheck record with company ID 3821 is included in Group 21, the paycheck record with company ID 2234324281 is included in Group 81, and the paycheck record with company ID 65436341 is included in Group 41.

At step 220, the third data subset comprising a third number of groups based on the second partition parameter is received. For example, the data parity system receives Groups 01-91 of record system 105.

At step 222, the fourth data subset comprising a fourth number of groups based on the second partition parameter is received. For example, the data parity system receives Groups 01-91 of record system 115.

At step 224, at least one group of the third number of groups is determined where data associated with the at least one group of the third number of groups does not match data associated with a corresponding group in the fourth number of groups. As described above in relation to step 210, the data parity system similarly confirms data parity between each corresponding group pair. For example, the data parity system calculates a sum of paycheck amounts for all paycheck records in Group 01 of record system 105 and a sum of paycheck amounts for all paycheck records in Group 01 of record system 115. As described above, other methods may also be used for data comparison between the groups. Having performed a data consistency check for one or more of the group pairs (i.e., groups 01-91 of record system 105 and corresponding groups 01-91 of record system 115), the data parity system may conclude that at least Group 81 of record system 105 and group 81 of record system 115 show inconsistency. This is because Group 81 of record system 105 comprises a paycheck record with company ID 2234324281 that has a paycheck amount of $2,333 while Group 81 of record system 115 comprises a paycheck record with company ID 2234324281 that has a paycheck amount of $12. For any of the group pairs that show data inconsistency, the data parity system may continue the operations of method 200, as described below.

At step 226, it is determined that a number of records associated with the corresponding group in the fourth number of groups does not exceed a threshold. If the number of records in Group 81 of record system 105 or record system 115 does not exceed the threshold, the data parity system may resynchronize the at least one group of the third number of groups with the corresponding group in the fourth number of groups in order to resync the first record system 105 with the second record system 115. In some embodiments, the resyncing may comprise requesting data reports from record systems 105 and 115, as further described below in relation to steps 228-230, and subsequently resyncing the two systems based on an analysis performed in step 232. A variety of different methods may be used for resyncing the two systems.

If the number of records in Group 81 of record system 115 of record system 115 exceeds a certain threshold, however, the data parity system may continue to increment the partition parameter using a partition increment (e.g., which may be the same as the previous partition increment) to obtain a third partition parameter. The data parity system may then request additional data subsets (e.g., fifth data subset and sixth data subset) from record system 105 and record system 115 respectively and compare data consistency among the groups received until the number of paycheck records in the groups received from the record systems is below the user-defined threshold amount.

At step 228, a first data report from the first record system for the at least one group of the third number of groups is requested. For example, the data parity system requests a data report from record system 105 for Group 81. The data report, in some embodiments, comprises all the paycheck records in Group 81, which at least includes the paycheck record with company ID 2234324281 with paycheck amount $2,333.

As described above, in some embodiments, after partitioning the records in response to requests from the data parity system, record systems 105 and 115 may only send back one or two data field values associated with each record in a group and not all the data field values or details regarding the record. Accordingly, once the data parity system identifies a group pair with data inconsistencies and determines that the number of records in one or both of the groups does not exceed a threshold, the data parity system may request data reports from the systems. In the data reports, the record systems may include more information than what is transmitted to the data parity system in response to requests for data subsets (e.g., steps 202-204 and 216-218). For example, records included in data reports may include more or all data fields of the corresponding records stored in the record systems.

At step 230, a second data report from the second record system for the corresponding group of the fourth number of groups is requested. For example, the data parity system requests a data report from record system 115 for Group 81. The data report, in some embodiments, comprises all the paycheck records in Group 81, which at least includes the paycheck record with company ID 2234324281 with paycheck amount $12.

At step 232, a record in the first data report that does not match a record in the second data report is determined. For example, after receiving and comparing the data reports received from record systems 105 and 115, the data parity system may determine that data relating to the two paycheck records with GUID 9f38 do not match. In some embodiments, once the source of data inconsistency is identified, the data parity system may then synchronize the two systems by correcting the inconsistency. In some embodiments, one of the record systems may be a source system that is considered to have the authoritative data. In such an example, the data parity system may use the correct information (e.g., correct paycheck record) that is included in the source system's data report to synchronize or resync the other system. For instance, if the source system is record system 115, the data parity system may transmit information regarding the paycheck record with GUID 9f38, having the correct paycheck amount of $12, to record system 105 for processing by record system 105. After receiving the information, in some embodiments, record system 105 may replace its copy of the paycheck record with GUID 9f38 with the paycheck record received from the data parity system.

In embodiments where a data parity system performs the operations of method 200, requesting and receiving data, such as in steps 202-208, 216-222, and 228-230, may be performed over a network that connect the data parity system with the two record systems (e.g., record systems 105 and 115). However, as described above, in some embodiments, instead of a data parity system being used to confirm data parity between record system 105 and record system 115, one of record systems 105 and 115 may, instead, identify data inconsistencies between the two systems. As an example, one of the systems may be a source system that stores authoritative data and the other system may be a "secondary system."

For example, suppose record system 105 is the secondary system and it is performing the data parity check. In such an example, record system 105 may request and receive data (e.g., in steps 202, 206, 216, 220, 228, etc.) from record system 115 over the network. However, the requesting and receiving associated with the other steps (e.g., steps 204, 208, 218, and 230) may not be performed by record system 105 over the network. More specifically, in such steps, the record system may request and receive data from an internal database that is a part of record system 105.

In some embodiments where one of record systems 105 and 115 performs the operations of method 200, one or more steps (e.g., steps 230 and 232) may become optional. For example, after identifying a group pair with a data inconsistency and determining that the number of records in either or both of the groups in the group pair does not exceed a predefined threshold, at step 228, record system 105 (the secondary system) may request a data report from record system 115 (the source system). However, instead of performing steps 230 and 232, record system 105 may update its records based on the data report received from record system 115 (the source system) at step 228. For example, by virtue of receiving the data report from the source system, all the corresponding paycheck records in record system 105 may be replaced with the paycheck records in the data report. In some other embodiments, record system 105 may receive the data report from the source system and compare the paycheck records included in the data report with the corresponding paycheck records stored in record system 105 to identify inaccurate paycheck record(s). In such embodiments, record system 105 may, therefore, use the data report to correct the inaccurate paycheck record store therein.

Figure 3:
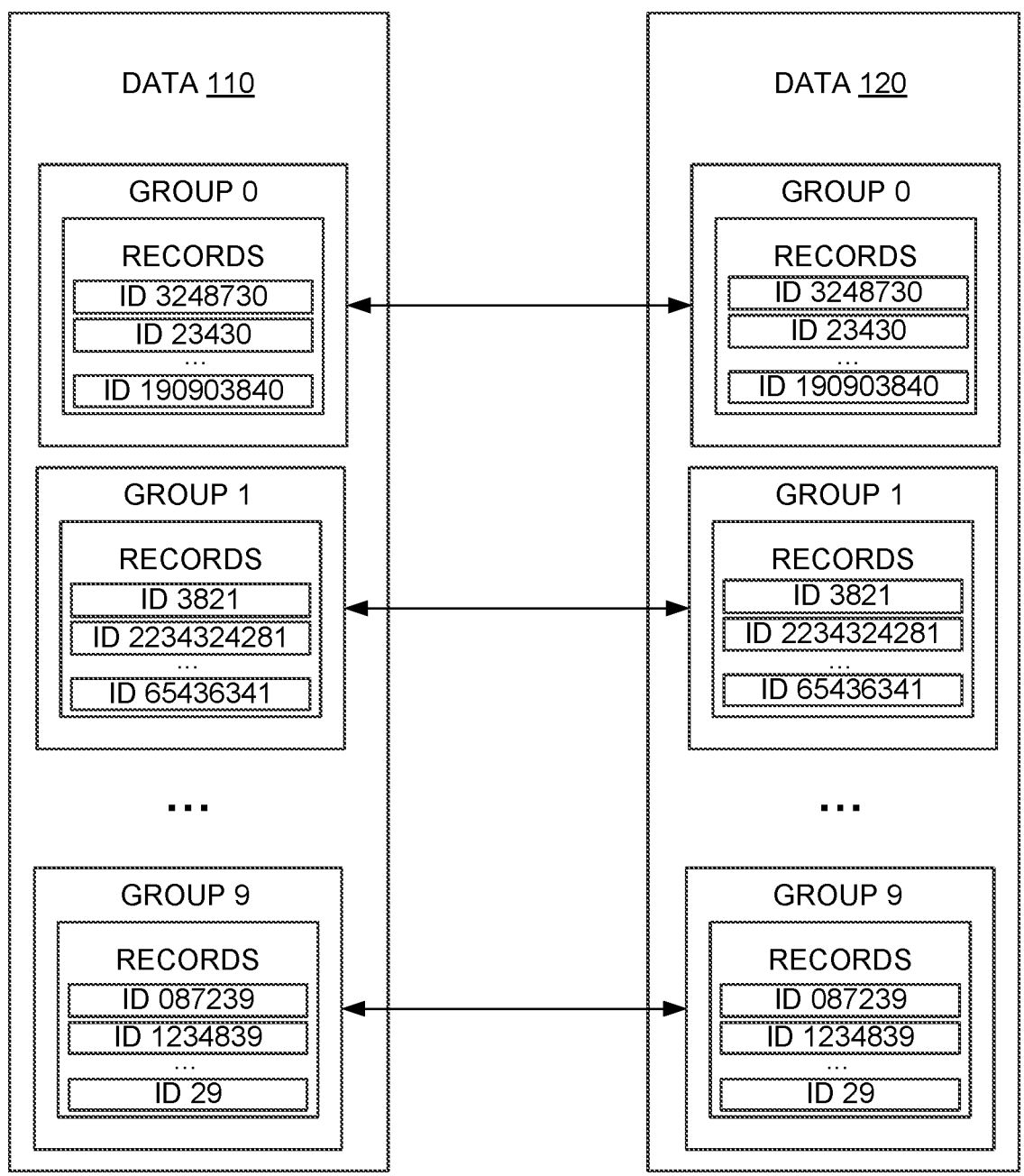
FIG. 3 illustrates example partitioning of data within two different systems using a partition parameter, in accordance with certain embodiments.

FIG. 3 illustrates example partitioning of data within two different systems using a partition parameter. For example, FIG. 3 shows data subsets received from record systems 105 and 115 when the first partition parameter is '1', as described in relation to steps 206-208 of method 200. As shown, Group 0 of record system 105 and Group 0 of record system 115 both include paycheck records with company IDs ending in 0. Group 1 of record system 105 and Group 1 of record system 115 both include paycheck records with company IDs ending in 1, etc.

FIG. 4 illustrates data partitioning in a record system using different partition parameters. As shown, the first and second data subsets received from record systems 105 and 115 are partitioned into 10 groups using partition parameter 1 (e.g., indicating the company IDs' last ending digit), which results in Groups 0-9. Having identified a data inconsistency (i.e., relating to paycheck record with company ID 2234324281) with Group 1 of each of the data subsets, Group 1 is then further partitioned into 10 groups (using partition parameter 2), resulting in Groups 01, 11, 21, . . . , 91. Further, having identified a data inconsistency (i.e., relating to paycheck record with company ID 2234324281) with Group 81 of each of the data subsets, Group 81 is then further partitioned into 10 groups (using partition parameter 3), resulting in Groups 081, 181, 281, . . . , 981. Note that FIG. 4 illustrates an additional round of partitioning compared to the example described in relation to method 200, where data reports were requested after determining a data inconstancy associated with Group 81 of record system 105 and Group 81 of record system 115. In the example of FIG. 4, it is assumed that the number of records in one or both of Groups 81 exceeds the pre-defined threshold and, therefore, and additional round of partitioning is performed resulting in receiving Groups 081-981.

Once it is determined that the source of the data inconsistency lies within Groups 281 and that the number of records therein does not exceed the threshold, the data parity system requests data reports from the systems. Data report 410 is an example of what a data report may include. As shown, data report 410 includes all paycheck records with company IDs ending in 281. Although the partitioning described in relation to method 200 is performed using the paycheck records' company IDs, as described above, in some embodiments, the partitioning may be performed using other partition fields, such as a GUID.

Figure 5:
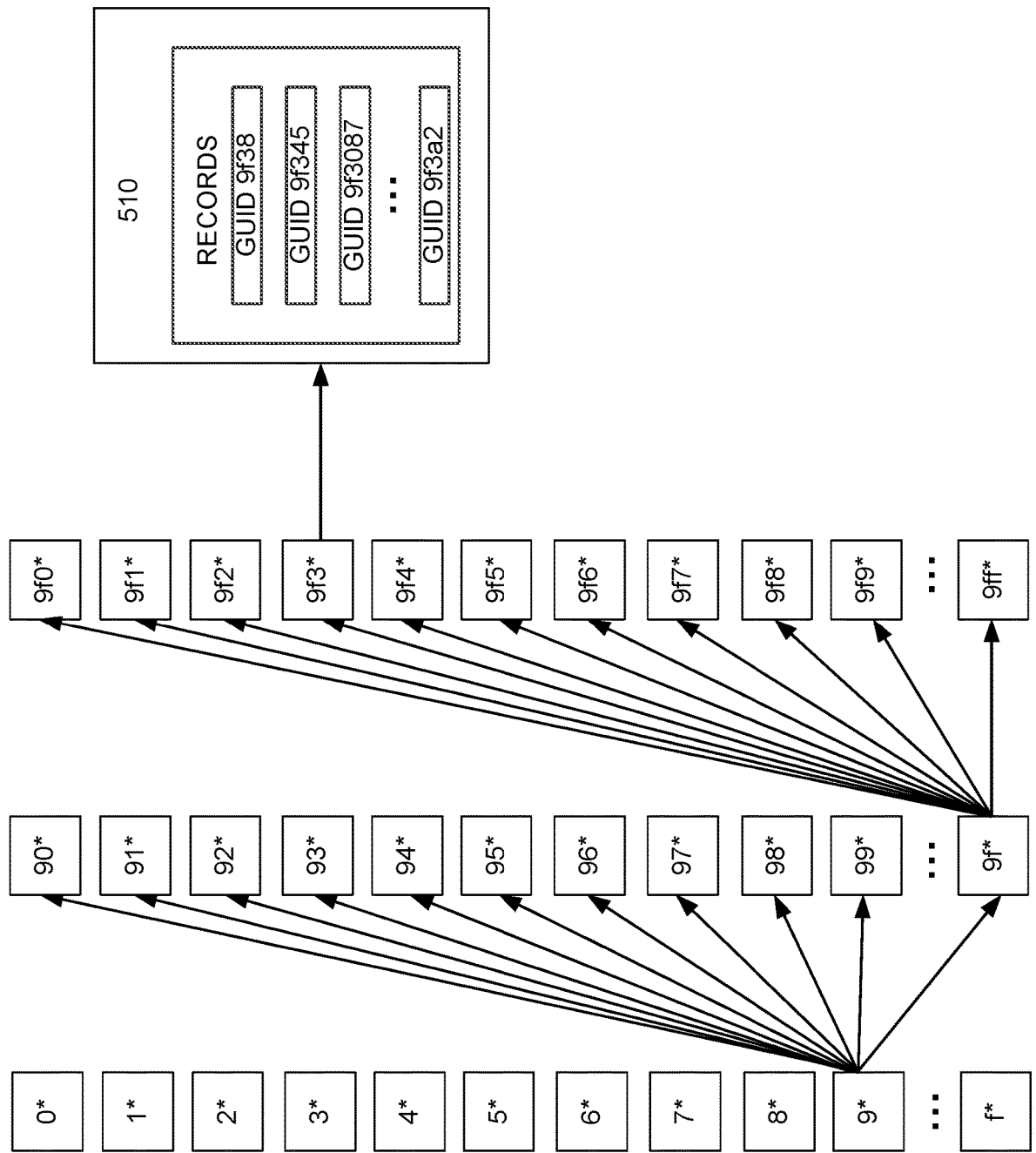
FIG. 5 illustrates an example partitioning of records in a record system based on the records' globally unique identifier (GUID), in accordance with certain embodiments.

FIG. 5 illustrates data partitioning in a record system using different partition parameters based on the records' GUIDs. Suppose method 200 is used to identify data inconsistencies between record system 105 and record system 115 using the records' GUIDs. A partition parameter of 1 is used in this example as well. As described above, the partition parameter indicates a number of data elements of the partition field, based on which the partitioning is performed. With a partition parameter of 1, therefore, the partitioning methodology described in relation to FIGS. 2A-4 required that the paycheck records be partitioned or grouped based on their last decimal number. However, in some embodiments, a different partitioning methodology may be used, requiring the paycheck records to be partitioned based on their partition field's first data elements. This partitioning methodology may be used in connection with any type of partition field (e.g., company ID, GUID, etc.). In some cases, this partitioning methodology may be used because it may be faster to partition records in a database system if the partitioning is performed from the first or starting data element(s) as opposed to the last or ending data element(s). FIG. 5 illustrates an example of this partitioning methodology.

As illustrated in FIG. 1, the paycheck record with an inaccurate paycheck amount across the two systems has a GUID of 9f38. Assuming a partition parameter of 1, FIG. 5 illustrates a first grouping of the paycheck records into 16 groups (Groups 0-f). Having identified a data inconsistency (i.e., relating to paycheck record with company ID 9f38) with Group 9 of each of the data subsets, Group 9 is then further partitioned into 16 groups (using partition parameter 2), resulting in Groups 90-9f. Further, having identified a data inconsistency (i.e., relating to paycheck record with company ID 9f38) with Group 9f of each of the data subsets, Group 9f is further partitioned into 16 groups (using partition parameter 3), resulting in Groups 9f0-9ff. Once it is determined that the source of the data inconsistency lies within Groups 9f3 of record system 105 and 120, and the number of records in Group 9f3 does not exceed the threshold, the data parity system requests data reports from the systems for Group 9f3. An example of what a data report may include is illustrated in FIG. 5. For example, data report 510 illustrates all the paycheck records with GUIDs starting with 9f3, such as GUID 9f38, 9f345, 9f3087, etc.

Figure 6:
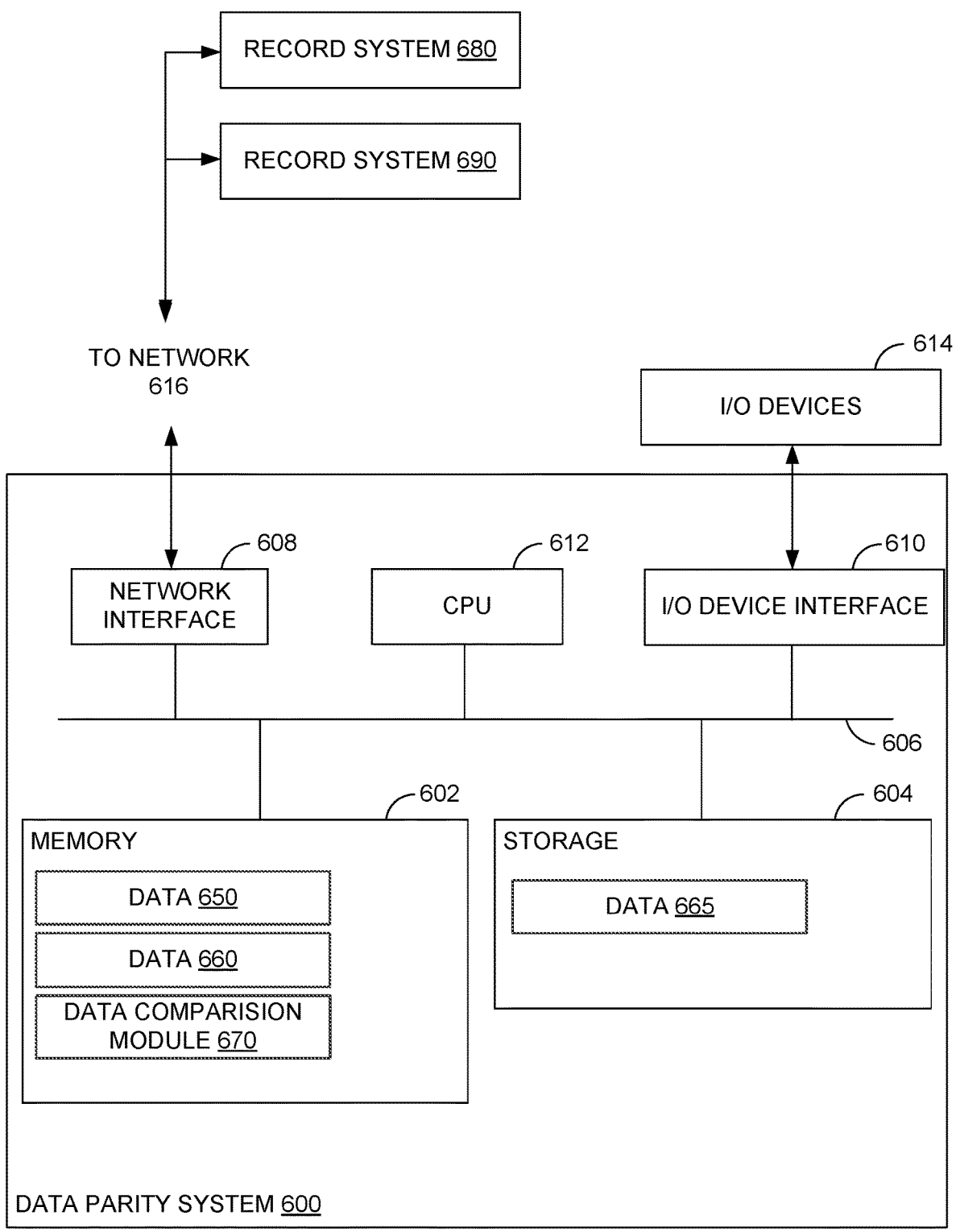
FIG. 6 illustrates an example system for identifying data inconsistencies between two systems, in accordance with certain embodiments.

FIG. 6 illustrates a data parity system 600 that confirms data parity among two or more systems, as described in relation to FIGS. 1-5. As shown, the data inconsistency identification system 600 includes, without limitation, a central processing unit (CPU) 612, at least one I/O device interface 610 which may allow for the connection of various I/O devices 614 (e.g., keyboards, displays, mouse devices, pen input, etc.) to the data inconsistency identification system 600, network interface 608, a memory 602, storage 604, and an interconnect 606.

CPU 612 may retrieve and execute programming instructions stored in the memory 602. Similarly, CPU 612 may retrieve and store application data residing in memory 602. Interconnect 606 transmits programming instructions and application data, among CPU 612, I/O device interface 610, network interface 608, memory 602, and storage 604. CPU 612 can represent a single CPU, multiple CPUs, a single CPU having multiple processing cores, and the like. Additionally, memory 602 represents random access memory. Furthermore, the storage 604 may be a disk drive. Although shown as a single unit, the storage 604 may be a combination of fixed or removable storage devices, such as fixed disc drives, removable memory cards or optical storage, network attached storage (NAS), or a storage area-network (SAN).

As shown, memory 602 includes a data comparison module 670 for performing the embodiments described herein. In embodiments where the data inconsistency identification system 600 is a data parity system (i.e., not one of the record systems that stores data) that performs the data parity check, memory 602 also includes data 650 and data 660 that are received from record system 680 and record system 690, respectively. Using data comparison module 670, data inconsistency identification system 600 then performs data parity check between record system 680 and record system 690. Note that data 650 and 660 may represent dynamic data, which may refer to data that may be changed as further updates to the information is received (e.g., new data or record groups being received as a result of incrementing the partition parameter).

In embodiments where the data inconsistency identification system 600 is one of the record systems, memory 602 may include data 650, which the data inconsistency identification system 600 may receive from a record system, such as record system 680, as well as 660, which may relate to or be a summary of data 665 that is stored in storage 604. In such embodiments, using data comparison module 670, the data inconsistency identification system 600 may perform data parity checks between data received from record system 680 (e.g., data 650) and data retrieved from storage 604. As described above, data 650 and 660 may represent dynamic data, which may refer to data that may be changed as further updates to the information is received (e.g., larger number of data or group records being received as a result of incrementing the partition parameter).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method of efficiently identifying data inconsistencies between electronic record systems using data partitioning, comprising:
    requesting a first data subset from a first record system using a first partition parameter;
    requesting a second data subset from a second record system using the first partition parameter;
    receiving the first data subset comprising a first number of groups based on the first partition parameter;
    receiving the second data subset comprising a second number of groups based on the first partition parameter, wherein one or more groups in the second number of groups correspond to one or more groups in the first number of groups;
    determining at least one group of the first number of groups where data associated with the at least one group of the first number of groups does not match data associated with a corresponding group in the second number of groups;
    if a number of records associated with the at least one group of the first number of groups exceeds a threshold:
        incrementing the first partition parameter by a partition increment to obtain a second partition parameter;
        requesting a third data subset from the first record system using the second partition parameter;
        requesting a fourth data subset from a second record system using the second partition parameter;
        receiving the third data subset comprising a third number of groups based on the second partition parameter;
        receiving the fourth data subset comprising a fourth number of groups based on the second partition parameter;
        determining at least one group of the third number of groups where data associated with the at least one group of the third number of groups does not match data associated with a corresponding group in the fourth number of groups; and
        if a number of records associated with the at least one group of the third number of groups does not exceed the threshold:
            resyncing the at least one group of the third number of groups with the corresponding group in the fourth number of groups.

2. The method of claim 1, wherein the resyncing further comprises:
    requesting a first data report from the first record system for the at least one group of the third number of groups;

requesting a second data report from the second record system for the corresponding group in the fourth number of groups;

determining a record in the first data report that does not match a record in the second data report; and resyncing the at least one group of the third number of groups with the corresponding group in the fourth number of groups based on determining that the record in the first data report does not match a record in the second data report.

3. The method of claim 1, wherein the first partition parameter determines how records in the first data subset are partitioned into the first number of groups and how records in the second data subset are partitioned into the second number of groups, and wherein the second partition parameter determines how records in the third data subset are partitioned into the third number of groups and how records in the fourth data subset are partitioned into the fourth number of groups.

4. The method of claim 1, wherein the first partition parameter indicates a number of data elements of a partition field associated with each record of the first data subset and each record of the second data subset, and wherein the second partition parameter indicates a number of data elements of a partition field associated with each record of the third data subset and each record of the fourth data subset.

5. The method of claim 4, wherein data elements of the partition field associated with each record of the first data subset and each record of the second data subset comprise digits, and wherein the number of data elements indicated by the first partition parameter is one or a higher number, and wherein a number of data elements of partition fields of a number of records in each group of the first number of groups correspond to identical one or more data element values, and wherein a number of data elements of partition fields of a number of records in each group of the third number of groups correspond to identical one or more data element values.

6. The method of claim 4, wherein data elements of the partition field associated with each record of the first data subset and each record of the second data subset comprise digits, and wherein a number of data elements of partition fields of records in each corresponding group pair from the first number of groups and the second number of groups correspond to identical one or more data element values, and wherein a number of data elements of partition fields of records in each corresponding group pair from the third number of groups and the fourth number of groups correspond to identical one or more data element values.

7. The method of claim 1, wherein the data elements comprise letters.

8. A computer system, comprising:

a non-transitory memory; and a processor configured to:

request a first data subset from a first record system using a first partition parameter;

request a second data subset from a second record system using the first partition parameter;

receive the first data subset comprising a first number of groups based on a first partition parameter;

receive the second data subset comprising a second number of groups based on the first partition parameter, wherein one or more groups in the second number of groups correspond to one or more groups in the first number of groups;

determine at least one group of the first number of groups where data associated with the at least one group of the first number of groups does not match data associated with a corresponding group in the second number of groups;

if a number of records associated with the at least one group of the first number of groups exceeds a threshold:

increment the first partition parameter by a partition increment to obtain a second partition parameter;

request a third data subset from the first record system using the second partition parameter;

request a fourth data subset from a second record system using the second partition parameter;

receive the third data subset comprising a third number of groups based on the second partition parameter;

receive the fourth data subset comprising a fourth number of groups based on the second partition parameter;

determine at least one group of the third number of groups where data associated with the at least one group of the third number of groups does not match data associated with a corresponding group in the fourth number of groups; and if a number of records associated with the at least one group of the third number of groups does not exceed the threshold:

resyncing the at least one group of the third number of groups with the corresponding group in the fourth number of groups.

9. The computer system of claim 8, wherein the resyncing further comprises:

requesting a first data report from the first record system for the at least one group of the third number of groups;

requesting a second data report from the second record system for the corresponding group in the fourth number of groups;

determining a record in the first data report that does not match a record in the second data report; and resyncing the at least one group of the third number of groups with the corresponding group in the fourth number of groups based on determining that the record in the first data report does not match a record in the second data report.

10. The computer system of claim 8, wherein the first partition parameter determines how records in the first data subset are partitioned into the first number of groups and how records in the second data subset are partitioned into the second number of groups, and wherein the second partition parameter determines how records in the third data subset are partitioned into the third number of groups and how records in the fourth data subset are partitioned into the fourth number of groups.

11. The computer system of claim 8, wherein the first partition parameter indicates a number of data elements of a partition field associated with each record of the first data subset and each record of the second data subset, and wherein the second partition parameter indicates a number of data elements of a partition field associated with each record of the third data subset and each record of the fourth data subset.

12. The computer system of claim 11, wherein data elements of the partition field associated with each record of the first data subset and each record of the second data subset comprise digits, and wherein the number of data elements indicated by the first partition parameter is one or a higher number, and wherein a number of data elements of partition fields of a number of records in each group of the first number of groups correspond to identical one or more data element values, and wherein a number of data elements of partition fields of a number of records in each group of the third number of groups correspond to identical one or more data element values.

13. The computer system of claim 11, wherein data elements of the partition field associated with each record of the first data subset and each record of the second data subset comprise digits, and wherein a number of data elements of partition fields of records in each corresponding group pair from the first number of groups and the second number of groups correspond to identical one or more data element values, and wherein a number of data elements of partition fields of records in each corresponding group pair from the third number of groups and the fourth number of groups correspond to identical one or more data element values.

14. The computer system of claim 11, wherein the data elements comprise letters.

15. A non-transitory computer readable medium comprising instructions to be executed in a computer system, wherein the instructions when executed in the computer system perform a method for efficiently identifying data inconsistencies between electronic record systems using data partitioning, the method comprising:
requesting a first data subset from a first record system using a first partition parameter;
requesting a second data subset from a second record system using the first partition parameter;
receiving the first data subset comprising a first number of groups based on a first partition parameter;
receiving the second data subset comprising a second number of groups based on the first partition parameter, wherein one or more groups in the second number of groups correspond to one or more groups in the first number of groups;
determining at least one group of the first number of groups where data associated with the at least one group of the first number of groups does not match data associated with a corresponding group in the second number of groups;
if a number of records associated with the at least one group of the first number of groups exceeds a threshold:
incrementing the first partition parameter by a partition increment to obtain a second partition parameter;
requesting a third data subset from the first record system using the second partition parameter;
requesting a fourth data subset from a second record system using the second partition parameter;
receiving the third data subset comprising a third number of groups based on the second partition parameter;
receiving the fourth data subset comprising a fourth number of groups based on the second partition parameter;
determining at least one group of the third number of groups where data associated with the at least one group of the third number of groups does not match data associated with a corresponding group in the fourth number of groups; and
if a number of records associated with the at least one group of the third number of groups does not exceed the threshold:
resyncing the at least one group of the third number of groups with the corresponding group in the fourth number of groups.

16. The non-transitory computer readable medium of claim 15, wherein the resyncing further comprises:
requesting a first data report from the first record system for the at least one group of the third number of groups;
requesting a second data report from the second record system for the corresponding group in the fourth number of groups;
determining a record in the first data report that does not match a record in the second data report; and
resyncing the at least one group of the third number of groups with the corresponding group in the fourth number of groups based on determining that the record in the first data report does not match a record in the second data report.

17. The non-transitory computer readable medium of claim 15, wherein the first partition parameter determines how records in the first data subset are partitioned into the first number of groups and how records in the second data subset are partitioned into the second number of groups, and wherein the second partition parameter determines how records in the third data subset are partitioned into the third number of groups and how records in the fourth data subset are partitioned into the fourth number of groups.

18. The non-transitory computer readable medium of claim 15, wherein the first partition parameter indicates a number of data elements of a partition field associated with each record of the first data subset and each record of the second data subset, and wherein the second partition parameter indicates a number of data elements of a partition field associated with each record of the third data subset and each record of the fourth data subset.

19. The non-transitory computer readable medium of claim 18, wherein data elements of the partition field associated with each record of the first data subset and each record of the second data subset comprise digits, and wherein the number of data elements indicated by the first partition parameter is one or a higher number, and wherein a number of data elements of partition fields of a number of records in each group of the first number of groups correspond to identical one or more data element values, and wherein a number of data elements of partition fields of a number of records in each group of the third number of groups correspond to identical one or more data element values.

20. The non-transitory computer readable medium of claim 18, wherein data elements of the partition field associated with each record of the first data subset and each record of the second data subset comprise digits, and wherein a number of data elements of partition fields of records in each corresponding group pair from the first number of groups and the second number of groups correspond to identical one or more data element values, and wherein a number of data elements of partition fields of records in each corresponding group pair from the third number of groups and the fourth number of groups correspond to identical one or more data element values.

* * * * *